United States Patent
Luo (10) Patent No.: US 8,924,449 B2
(45) Date of Patent: Dec. 30, 2014

(54) METHOD AND APPARATUS FOR IMPLEMENTING VARIABLE SYMBOL RATE

(75) Inventor: Wei Luo, Shenzhen (CN)

(73) Assignee: Shenzhen Coship Electronics Co., Ltd., Shenzhen, Guangdong Province (CN)

( * ) Notice: Subject to any disclaimer, the term of this patent is extended or adjusted under 35 U.S.C. 154(b) by 699 days.

(21) Appl. No.: 13/145,558

(22) PCT Filed: Dec. 29, 2009

(86) PCT No.: PCT/CN2009/076205
§ 371 (c)(1),
(2), (4) Date: Jul. 20, 2011

(87) PCT Pub. No.: WO2010/083716
PCT Pub. Date: Jul. 29, 2010

(65) Prior Publication Data
US 2011/0280355 A1 Nov. 17, 2011

(30) Foreign Application Priority Data
Jan. 21, 2009 (CN) .......................... 2009 1 0077514

(51) Int. Cl.
*G06F 1/02* (2006.01)
*G06F 1/03* (2006.01)
(52) U.S. Cl.
CPC .................................. *G06F 1/0335* (2013.01)
USPC ............................ 708/270; 708/271; 375/359

(58) Field of Classification Search
None
See application file for complete search history.

(56) References Cited

U.S. PATENT DOCUMENTS

| | | | |
|---|---|---|---|
| 6,888,888 B1 * | 5/2005 | Tu et al. | 375/240.01 |
| 6,965,616 B1 * | 11/2005 | Quigley et al. | 370/480 |
| 2007/0036176 A1 * | 2/2007 | Quigley et al. | 370/468 |

FOREIGN PATENT DOCUMENTS

| CN | 1250295 A | 4/2000 |
|---|---|---|
| CN | 1833349 A | 9/2006 |
| CN | 101483439 A | 7/2009 |

* cited by examiner

*Primary Examiner* — Michael D Yaary
(74) *Attorney, Agent, or Firm* — Cheng-Ju Chiang (57) ABSTRACT

A method for implementing variable symbol rate, presetting counters M and N, and M=1, N=0, f being the preset output symbol rate, fs being the frequency of input clock, the method comprises: triggering to judge whether N×f is greater than M×fs at the rising edge of the input clock, if it is, letting the counter M add 1 and outputting a clock pulse; else further judging whether the value of the counter N is equal to fs−1; when N=fs−1, letting the counter N return to 0, and waiting for the next rising edge of the input clock; when N≠fs−1, waiting for the next rising edge of the input clock after letting the counter N add 1; letting the output clock pulse be the system clock, controlling the data to be output to set the symbol rate output.

6 Claims, 4 Drawing Sheets

METHOD AND APPARATUS FOR IMPLEMENTING VARIABLE SYMBOL RATE

This application for patent is claimed for a right of priority of CHINA 200910077514.6 filed in Jan. 21, 2009, entitled "METHOD AND APPARATUS FOR IMPLEMENTING VARIABLE SYMBOL RATE". All contents of the above-identified application are incorporated herein by reference. Besides, the present application is a 35 U.S.C. §371 National Phase conversion of International (PCT) Patent Application No. PCT/CN2009/076205, filed on Dec. 29, 2009, the disclosure of which is incorporated by reference herein. The PCT International Patent Application was published in Chinese.

FIELD OF THE INVENTION

The present invention generally relates to technologies in signal modulation technology field, and more particularly to a method and apparatus for implementing variable symbol rate.

BACKGROUND OF THE INVENTION

A modulator popular in current market usually has an adjustable function of variable symbol rate. However, a symbol rate and a clock frequency has a direct relationship, thus, in present, a variable symbol rate is usually implemented through a clock adjustable chip outputting a variable clock signal, so that the symbol rate can be adjusted.

All the chips with clock adjustable function of the main stream of the current market are chips adopting a direct digital frequency synthesis (DDFS, DDS for short) technology. The so-called DDS is a new technology of frequency synthesis that synthesizes the required wave directly from the concept of phase. At present, major chip manufacturers one after another offer high-performance, multi-functional DDS chips produced with newest complementary metal-oxide-semiconductor (CMOS) technology, such as the AD9910, AD9912 chips of the Analog Devices Cooperation, which can be used for outputting a variable clock signal.

Figure 1:
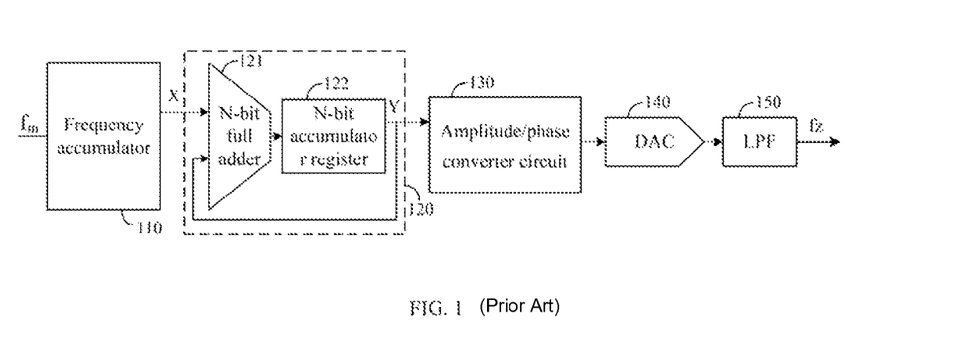
FIG. 1 shows a circuit schematic diagram of a conventional DDS chip.

FIG. 1 shows a circuit schematic diagram of a DDS chip, in which the DDS generates a frequency and phase controlled sine wave through a digitally controlled oscillator. The DDS chip generally includes a frequency accumulator 110, a phase accumulator 120, an amplitude/phase converter circuit 130, a digital-analog converter (DAC) 140 and a low-pass filter (LPF) 150, wherein:

The frequency accumulator 110 is used for operating an accumulating calculation of input signal (fin labeled in FIG. 1), and generating a frequency control word X (also called phase step value).

The phase accumulator 120 is further cascaded by an N-bit full adder 121 and a N-bit accumulator register 122, from FIG. 1, the phase accumulator 120 is a typical feedback circuit used for operating an accumulating calculation of the binary frequency control word X that represents frequency, and generating an accumulated phase data Y, the accumulated phase data Y is output after being locked by the N-bit accumulator register 122.

The amplitude/phase converter circuit 130 is essentially a waveform memory, which is used for making a table lookup based on the accumulated phase data Y generated by the phase accumulator 120 and transmitting the obtained data to DAC 140, and the data is further transmitted to the LPF 150 through the DAC 40.

The detailed work process of above-mentioned DDS chip is described as follows.

The DDS chip is connected to a reference clock fz, when receiving a clock pulse, the N-bit full adder 121 adds the frequency control word X and the accumulated phase data Y generated in the prior cycle of the current clock cycle fed back by the N-bit accumulator register 122 together, and transmits the added result to the input end of the N-bit accumulator register 122.

In one aspect, the new accumulated phase data Y generated from the current clock cycle is fed back to the input end of the N-bit full adder 121 through the N-bit accumulator register 122, so that the adder can continue to add the frequency control word X with the function of the pulse of the later cycle of the current cycle; in another aspect, the accumulated phase data Y is transmitted to the amplitude/phase converter circuit 130 as a sampling address value.

Based on the sampling address value, the amplitude/phase converter circuit 130 looks up the waveform data corresponding to the address value, and outputs a corresponding waveform data.

It should to be pointed out is that, the waveform data output by the amplitude/phase converter circuit 130 is a digital data, and the digital data is converted into an analog signal through the DAC 140, a sine wave with output frequency fs is obtained after the stray wave and the harmonic wave being filtered by the LPF 150, and the output frequency fs is determined by fz, X and N, that is, $fs = X \cdot fz/2^N$, wherein $X < 2^N - 1$.

For example, suppose that the reference clock fz is 70 MHz, the phase accumulator 120 is a 16-bit accumulator (that is, N=16), binary frequency control word X is 4096, then, $4096 \times 70/2^{16} = 4.375$ MHz.

Due to the reference clock fz generally is fixed, thus, in theory, the output with any frequency can be generated by setting the bit (that is, the value of N) and the value of the frequency control word X.

However, the clock adjustable chip can output a variable clock signal, but also has some evident defects.

First, the clock adjustable chip has high cost and high price, for example, the chips such as AD9910, AD9912, the price of the single chip usually is much higher the other elements in the modulator apparatus.

In addition, in use, the adjustable range of the output symbol rate is larger, and the generality is better, but the adjustable range of the output symbol rate is larger, the frequency range of the system clock of the modulator is correspondingly larger. For example, if a system requires an output symbol rate of 2 Mbps~9 Mbps, the relationship of the system clock frequency and the output symbol rate is 20:1, and the corresponding adjustable range of the system clock is 40 MHz~180 MHz. In actual signal system, when the work frequency range of the system clock chip is large, a harmonic wave and a stray wave difficult to be removed may be generated inside the chip in work, thus, it make a great impact on the work performance of the whole system.

SUMMARY OF THE INVENTION

The invention is directed to provide a method and apparatus for implementing variable symbol rate, which can realize a variable symbol rate with a low cost and a stable performance.

For the above reasons, the technology of the present invention is implemented as follows.

A method for implementing variable symbol rate, presetting counters M and N, and M=1, N=0, f being a preset output symbol rate, fs being a frequency of input clock, the method comprises:

triggering to judge whether N×f is greater than M×fs at the rising edge of the input clock, if it is, letting the counter M add 1 and outputting a clock pulse; else further judging whether the value of the counter N is equal to fs−1;

when N=fs−1, letting the counter N return to 0, and waiting for the next rising edge of the input clock; when N≠fs−1, waiting for the next rising edge of the input clock after letting the counter N add 1;

letting the output clock pulse be the system clock, controlling the data to be output to set the symbol rate output.

A method for implementing variable symbol rate, presetting counters M, N and Q, and M=1, N=0, Q=0, f being a preset output symbol rate, fs being a frequency of input clock, p being a pipeline series number, the method comprises:

judging if N×f is greater than M×fs in the pipeline at a No. i rising edge of the input clock, i is a natural number, and obtaining a judged result of whether Ni−p×f is larger than Mi−p×fs when the No. i−p rising edge of the input clock entering the pipeline;

if the judged result is that Ni−p×f is larger than Mi−p×fs, when Q=0, letting the counter M, Q add 1 and outputting a clock pulse; when Q=p, letting the counter Q return to 0; when Q≠0 and Q≠p, letting the counter Q add 1;

if the judged result is that Ni−p×f is not larger than Mi−p×fs, further judging whether the value of the counter N is equal to fs−1; when N=fs−1, letting the counter N return to 0 and waiting for the next rising edge of the input clock; when N≠fs−1, letting the counter N add 1 and waiting for the next rising edge of the input clock;

letting the output clock pulse be the system clock, controlling the data to be output to set the symbol rate output.

An apparatus for implementing variable symbol rate, the apparatus comprising counters M and N, the original values of the counters being preset to be M=1, N=0, f being a preset output symbol rate, fs being a frequency of input clock, the apparatus further comprises:

a first judging module, used for judging whether N×f is greater than M×fs at the rising edge of the input clock, if it is, letting the counter M add 1 and noticing a pulse generator module, else further noticing a second judging module;

a second judging module, used for receiving the notice of the first judging module and judging whether the value of the counter N is equal to fs−1; when N=fs−1, letting the counter N return to 0; when N≠fs−1, letting the counter N add 1;

an output pulse generator module, used for generating an output pulse according to the notice of the first judging module and transmitting the generated output pulse to a symbol output module; and a symbol output module, used for receiving the output pulse of the output pulse generator module, letting the output pulse be the system clock, controlling the data to be output to set the symbol rate output.

An apparatus for implementing variable symbol rate, the apparatus comprising counters M, N and Q, the original values of the counters being preset to be M=1, N=0, Q=0, f being a preset output symbol rate, fs being a frequency of input clock, p being a pipeline series number, the apparatus further comprises:

a first judging module, used for judging whether Ni×f is greater than Mi×fs in the input end of the pipeline module at a No. i rising edge of the input clock, and receiving a judged result of whether Ni−p×f is greater than Mi−p×fs from an output end of the pipeline module, wherein the judged result is a No. i−p rising edge of the input clock entering the input end of the pipeline module, and i is a natural number; if the judged result is that Ni−p×f is greater than Mi−p×fs, noticing a second judging module, if the judged result is that Ni−p×f is not greater than Mi−p×fs, noticing a third judging module;

a second judging module, used for receiving the notice of the first judging module, and further judging whether Q is equal to 0 or p, if Q=0, letting the counters M, Q add 1 and noticing an output pulse Q≠p, letting the counter Q add 1;

a third judging module, used for further judging whether the value of the counter N is equal to fs−1; when N=fs−1, letting the counter N return to 0; when N≠fs−1, letting the counter N add 1;

a pipeline module, used for receiving whether Ni×f is greater than Mi×fs from the first judging module and beginning to judge at a No. i rising edge of the input clock, and returning the judged result to the first judging module after delaying a number of p rising edges of the input clock;

an output pulse generator module, used for generating an output pulse according to the notice of the second judging module and transmitting the generated output pulse to a symbol output module;

a symbol output module, used for receiving the output pulse of the output pulse generator module, letting the output clock pulse be the system clock, controlling the data to be output to set the symbol rate output.

It can be concluded from the above-mentioned technology, in the embodiment of the present invention of the method and apparatus for implementing variable symbol rate, it uses FPGA programming to implement periodically outputting a fixed number of output pulses in a fixed period, and lets the fixed number of output pulses be the system clock of the symbol output system to implement the symbol output of set symbol rate, further implements variable symbol rate output through modifying the set parameter of the FPGA. Due to the present invention implements variable symbol rate output through a system clock in a fixed frequency, thus, the impact of the stray wave and the harmonic wave caused by variable system clock can be avoided, and the performance is stable. Besides, due to the cost of FPGA is low, thus, compared with the variable clock chip in conventional technology, the cost of the present invention is much lower.

DETAILED DESCRIPTION OF PREFERRED EMBODIMENTS

For the objectives, features, and advantages of the present invention being better understood and legibly, the present invention will now be described more specifically with reference to the drawings and accompanying embodiments are particularized.

Figure 2:
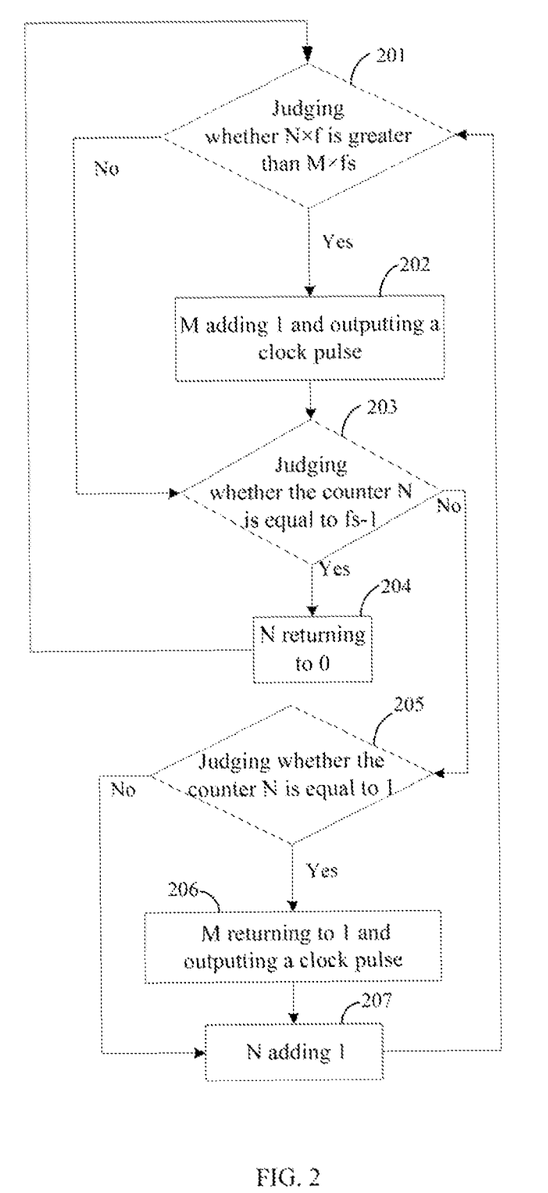
FIG. 2 shows a schematic flow diagram of a method for implementing variable symbol rate in accordance with a preferred embodiment of the present invention.

In the embodiment, a method for implementing variable symbol rate is provided. The detailed implement process of the method is shown in FIG. 2, wherein the method includes:

Step 201: Judging whether N×f is greater than M×fs at the rising edge of outside input clock, if N×f is greater than M×fs, the process continues by going to step 202, else the process goes to step 203, wherein, setting the original value of the counter M to 1, the original value of the counter N is 0;

Step 202: The counter M adding 1 and outputting a clock pulse, further the process goes to step 203;

Step 203: Judging whether the counter N is equal to fs−1, if it is, the process goes to step 204, else the process goes to step 205;

Step 204: The counter N returning to 0, further the process returns to step 201;

Step 205: Judging whether the counter N is equal to 1, if it is, the process goes to step 206, else the process goes to step 207;

Step 206: The counter M returning to 1 and outputting a clock pulse, further the process goes to step 207;

Step 207: The counter N adding 1, further the process returns to step 201.

It should be understood that, letting the output clock pulse be the system clock can implement the setting of the symbol rate output.

Wherein, fs (KHz is the base unit) is the clock frequency of the outside input clock, f (KHz is the base unit) is a symbol rate to be obtained. The clock signal of the outside input clock can be generated by a clock generator circuit consisting of common crystals or clock crystals, many manners are provided by conventional technology, here we will not go further on this point.

Besides, about the process of steps 201~207, it should be explained that, due to the above-mentioned method is implemented based on FPGA hardware circuit, thus, one ordinarily skilled in the art should understand that, the current value of each the counters keep constant before a clock rising edge triggering process being finished. For example, suppose that the triggering process of the No. i clock rising edge is in current, though in step 202, the counter M adds 1, M remains unchanged in the process after step 202 before the current process being finished. The counter N is the same, here we describe together and will not go further on this point repeatedly.

For further describing the process of above steps 201~207, the present invention will now be described more specifically with particularizing accompanying embodiments in two situations.

In a first situation, fs is an integral multiple of f.

For example, fs=10 KHz, f=5 KHz; setting the original values of the counters M and N to be M=1, N=0; when the FPGA starts working:

1) At the first rising edge of the outside input clock (in simply, the No. i rising edge of the input clock is presented as Pi below, i is a positive integer): N=0, M=1;

N×f=0, M×fs=30, as a result, (N×f)<(M×fs), letting N add 1;

2) P2: N=1, M=1, as a result, (N×f)<(M×fs);

Due to N=1, letting M return to 1, however, the original value of M is 1, thus, the value of M is unchanged, outputting a clock pulse; letting N add 1;

3) P3: N=2, M=1, as a result, (N×f)<(M×fs), letting N add 1;

. . .

8) P8: N=7, M=1, as a result, (N×f)<(M×fs), letting M add 1 and outputting a clock pulse; letting N add 1;

9) P9: N=8, M=2, as a result, (N×f)<(M×fs), letting N add 1;

. . .

14) P14: N=13, M=2, as a result, (N×f)>(M×fs), letting M add 1 and outputting a clock pulse; letting N add 1;

15) P15: N=14, M=3, as a result, (N×f)<(M×fs), letting N add 1;

. . .

20) P20: N=19, M=3, as a result, (N×f)>(M×fs), letting M add 1 and outputting a clock pulse; letting N add 1;

21) P21: N=20, M=4, as a result, (N×f)<(M×fs), letting N add 1;

. . .

26) P26: N=25, M=4, as a result, (N×f)>(M×fs), letting M add 1 and outputting a clock pulse; letting N add 1;

27) P27: N=26, M=5, as a result, (N×f)<(M×fs), letting N add 1;

. . .

30) P30: N=29, M=5, as a result, (N×f)<(M×fs), now judging that N=fs−1, letting N return to 0 in step 204;

31) P31: N=0, M=5, as a result, (N×f)<(M×fs), letting N add 1;

32) P32: N=1, M=5, as a result, (N×f)<(M×fs), now judging that N=1, letting M return to 1 and outputting a clock pulse; letting N add 1;

33) P33: N=2, M=1, as a result, (N×f)<(M×fs), letting N add 1;

It can be seen from this that, at the time of P33 and P3, the values and process of M and N are exactly alike, it can be easily obtained after further deduction that, from P33, P34 and P4 are exactly alike, P35 and P5 are exactly alike, that is, P3~P33 are a cycle, the cycle is repeated from P33 until the process of FPGA is discontinued by outside element.

It should be explained that, steps 205~206 of the present invention that when N=1, letting the counter M to 1 in essence have the function for forcibly adding an output pulse when N=1, so as to ensure the uniformity of the output pulse and smooth transition of the below cycles. From above embodiment, due to since P3, the method provided in the present invention can ensure that one output pulse can be generated in every period of six input clocks, and the mechanism of letting M return to 1 when N=1 ensures that the process can smoothly return to P3 (that is P33) after P32 being completed, thus, the original state (P3) and the terminal state (P32) of the cycle can be transited precisely.

From above embodiment, since P3, one output pulse should be generated after each six rising edges of the input clock, and the frequency of the output pulse is 30/6=5 KHz=f. Therefore, letting the output clock pulse having a frequency f be the system clock signal for controlling symbol rate output, a data output with symbol rate of f can be implemented by the manner of symbol output through a fixed clock in conventional technology, and here we will not go further on the detail of the manner.

In a second situation, fs is not an integral multiple of f.

For example, fs=28 KHz, f=5 KHz; setting the original values of the counters M and N to be M=1, N=0; when the FPGA starts working:

1) P1: N=0, M=1;

N×f=0, M×fs=28, as a result, (N×f)<(M×fs), letting N add 1;

2) P2: N=1, M=1, as a result, (N×f)<(M×fs);

Due to N=1, letting M return to 1, the original value of M is 1, thus, the value of M is unchanged, outputting a clock pulse; letting N add 1, 3) P3: N=2, M=1, as a result, (N×f)<(M×fs), letting N add 1;
...
7) P7: N=6, M=1, as a result, (N×f)<(M×fs), letting M add 1 and outputting a clock pulse; letting N add 1;
8) P8: N=7, M=2, as a result, (N×f)>(M×fs), letting N add 1;
...
13) P13: N=12, M=2, as a result, (N×f)>(M×fs), letting M add 1 and outputting a clock pulse; letting N add 1;
14) P14: N=13, M=3, as a result, (N×f)<(M×fs), letting N add 1;
...
18) P18: N=17, M=3, as a result, (N×f)>(M×fs), letting M add 1 and outputting a clock pulse; letting N add 1;
19) P19: N=18, M=4, as a result, (N×f)<(M×fs), letting N add 1;
...
24) P24: N=23, M=4, as a result, (N×f)>(M×fs), letting M add 1 and outputting a clock pulse; letting N add 1;
25) P25: N=24, M=5, as a result, (N×f)<(M×fs), letting N add 1;
...
28) P28: N=27, M=5, as a result, (N×f)<(M×fs), now judging that N=fs−1, letting N return to 0;
29) P29: N=0, M=5, as a result, (N×f)<(M×fs), letting N add 1;
30) P30: N=1, M=5, as a result, (N×f)<(M×fs), now judging that N=1, letting M return to 1 and outputting a clock pulse; letting N add 1;
31) P31: N=2, M=1, as a result, (N×f)<(M×fs), letting N add 1;

It can be seen from this that, at the time of P31 and P3, the values and process of M and N are exactly alike, it can be easily obtained after further deduction that, from P31, P32 and P4 are exactly alike, P33 and P5 are exactly alike, that is, P3~P30 are a cycle, and the cycle is repeated from P31 until the process of FPGA is discontinued by outside element.

Meanwhile, it can be obtained from the frequency of the output pulse in above embodiment, P3~P7 are five input clock cycles, P8~P13 are six input clock cycles, P14~P18 are five input clock cycles, P19~P24 are six input clock cycles, P25~P30 are six input clock cycles. Of course, the frequency of the output pulse is not precisely 5 KHz, but changes in a certain range around 5 KHz. Through the change of the frequency of every output pulse is not regular, but in a longer time, from P3 to P30, at twenty-eight rising edges of the input clock, five output pulses are generated through the method of the present invention. Besides, it should be understood that, due to P3~P30 form a cycle, the twenty-eight rising edges since P31 can repeat the five output pulses in the same manner of P3~P30. About the situation of that periodically outputting a fixed number (five in the embodiment) of output pulses in a fixed period (twenty-eight clock cycles in the embodiment), and the amplitude of variation of the output pulse interval is very small compared with the output pulse interval (in the embodiment, the shortest output pulse interval is five clock cycles, the longest output pulse interval is six clock cycles, the amplitude of variation of the output pulse interval is one clock cycle, said one clock cycle is very small compared with the output pulse interval), an algorithm for implementing symbol output when letting the output clock pulse in this situation be the system clock of the symbol output system is provided in <Research and Design on DVB-C Variable Symbol rate modulator> (Zhejiang University Master's degree paper, author: Lv Jun, in March of 2005), because the limited space, the detailed description is not provided here, and one ordinarily skilled in the art can implement the method with reference to the disclosure of said document.

It should be explained that, in the method of the present invention, a multiply operation is needed when the FPGA process the step of judging whether N×f is greater than M×fs. In actual hardware circuit, with constantly increase of the system clock frequency, compared with the period of the system clock, the time taken by multiply operation usually should not be omitted, and multiply operation often needs two or more periods of the system clock. According to the common sense of those ordinarily skilled in the art, in this situation, the multiplier further requires a pipeline algorithm to implement the multiply operation, the series number of the pipeline is chosen according to the number of input clock periods required by the multiply operation, n series pipeline can cause a delay of a number of n input clock periods (n is a positive integer).

It can be understood that, the above-mentioned embodiment is implemented without consideration of the delay caused by the pipeline algorithm. However, in actual operation, the delay caused by the pipeline algorithm must be considered.

Figure 3:
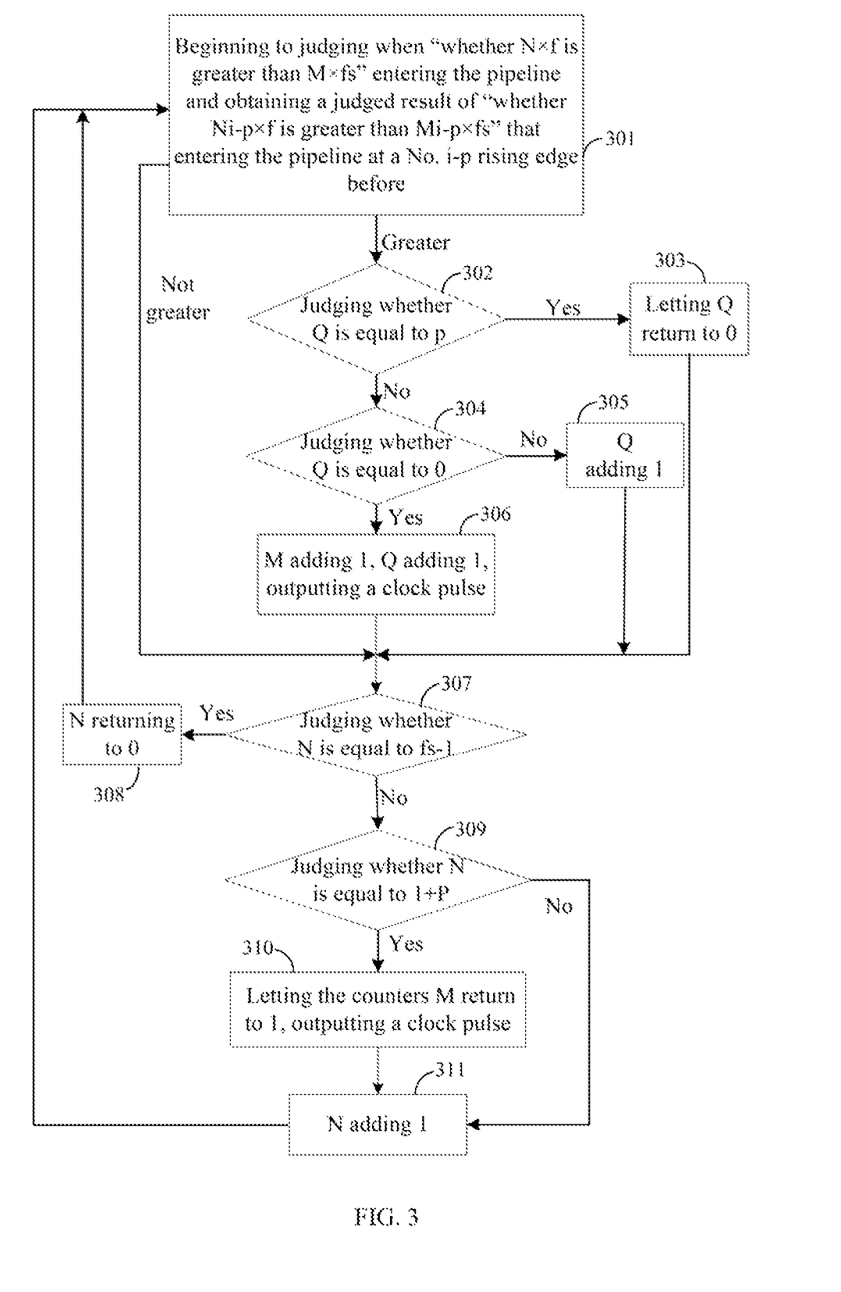
FIG. 3 shows a schematic flow diagram of a method for implementing variable symbol rate with a pipeline delay in accordance with a preferred embodiment of the present invention.

Correspondingly, another method for implementing variable symbol rate is provided in the present invention. The detailed implement process of the method is shown in FIG. 3. In order to facilitate describe, it takes a process after a clock rising edge coming for explanation as follows, the method specifically includes:

Step 301: Beginning to judging when "whether N×f is greater than M×fs" entering the pipeline at a No. i rising edge of the outside input clock, and obtaining a judged result of "whether Ni−p×f is greater than Mi−p×fs" that entering the pipeline at a No. i−p rising edge before; if the judged result is that "Ni−p×f is greater than Mi−p×fs", the process goes to step 302, else goes to step 307;

Wherein Ni, Mi respectively represent the value of the counter N and M at the time of No. i rising edge, p represents the series number of the pipeline; due to p-series pipeline may cause the output of judged result to delay a number of p clock rising edges, thus, the judge condition of the No. i−p rising edge entering the pipeline should output a judged result at the No. i rising edge.

Step 302: Judging whether the current value of the counter Q is p, if it is, the process goes to step 303, else the process goes to step 304;

Step 303: Letting the counter Q return to 0, continue to step 307;

Step 304: Further judging whether the current value is 0, if it is, the process goes to step 306, else the process goes to step 305;

Step 305: Letting the counter Q add 1, continue to step 307;

Step 306: Letting the counters M and Q respectively add 1, outputting a clock pulse, continue to step 307;

Step 307: Further judging whether the current value of the counter N is fs−1, if it is, the process goes to step 308, else the process goes to step 309;

Step 308: Letting the counter N return to 0, return to step 301;

Step 309: Further judging whether the current value of the counter N is 1+p, if it is, the process goes to step 310, else the process goes to step 311;

Step 310: Letting the counters M return to 1, outputting a clock pulse, continue to step 311;

The effect of the steps 309~310 is similar with the steps 205~206 described above, that is, when N=1+p, letting the counter M return to 1, which is also in order to ensure the uniformity of the output pulse and smooth transition of the below cycles. Due to the delay caused by pipeline is not considered when N=1, letting M return to 1 in steps 205~206, thus, if a p-series pipeline is added, the output time of the forcibly output pulse is correspondingly backward delayed.

Step 311: Letting the counters N add 1, return to step 301, and waiting for the next (that is, No. i+1) clock rising edge coming.

It should be understood that, letting the output clock pulse be the system clock can implement the setting of the symbol rate output.

For further describing the process of above steps 301~311, it will be described more specifically with particularizing accompanying embodiments.

For example, fs=20 KHz, f=5 KHz, suppose that the multiply operation requires to be completed in two input clock periods, and two or more series pipeline is required to be added in the multiplier, the series number of the pipeline may be set to two. Now, presetting the original values of the counters M, N and Q respectively to be M=1, N=0, Q=0; when the FPGA starts working:

1) P1: N=0, M=1, Q=0;
judging when "whether 0×5 is greater than 1×20" entering the pipeline, letting N add 1;

2) P2: N=1, M=1, Q=0;
judging when "whether 1×5 is greater than 1×20" entering the pipeline, letting N add 1;

3) P3: N=2, M=1, Q=0;
judging when "whether 2×5 is greater than 1×20" entering the pipeline, letting N add 1;
the judged result of "whether 0×5 is greater than 1×20" entering the pipeline at time P1 to be judged is obtained with a delay of two clock pulse, the judged result is "0×5 is not greater than 1×20";

4) P4: N=3, M=1, Q=0;
judging when "whether 3×5 is greater than 1×20" entering the pipeline, letting N add 1;
the judged result of "whether 1×5 is greater than 1×20" entering the pipeline at time P2 to be judged is obtained, the judged result is "1×5 is not greater than 1×20"; now N=3 (that is, N=1+p), thus, letting M return to 1, the current value of M is 1, thus, the value of M is unchanged, and outputting a clock pulse;

5) P5: N=4, M=1, Q=0;
judging when "whether 4×5 is greater than 1×20" entering the pipeline, the judged result of "whether 2×5 is greater than 1×20" entering the pipeline at time P3 to be judged is obtained, the judged result is "2×5 is not greater than 1×20", letting N add 1;

6) P6: N=5, M=1, Q=0;
judging when "whether 5×5 is greater than 1×20" entering the pipeline, the judged result of "whether 3×5 is greater than 1×20" entering the pipeline at time P4 to be judged is obtained, the judged result is "3×5 is not greater than 1×20", letting N add 1;

7) P7: N=6, M=1, Q=0;
judging when "whether 6×5 is greater than 1×20" entering the pipeline, the judged result of "whether 4×5 is greater than 1×20" entering the pipeline at time P5 to be judged is obtained, the judged result is "4×5 is not greater than 1×20";

8) P8: N=7, M=1, Q=0;
judging when "whether 7×5 is greater than 1×20" entering the pipeline, the judged result of "whether 5×5 is greater than 1×20" entering the pipeline at time P6 to be judged is obtained, the judged result is "5×5 is greater than 1×20"; now Q=0, thus, letting both M and N add 1, and outputting a clock pulse, letting N add 1;

9) P9: N=8, M=2, Q=1;
judging when "whether 8×5 is greater than 1×20" entering the pipeline, the judged result of "whether 6×5 is greater than 1×20" entering the pipeline at time P7 to be judged is obtained, the judged result is "6×5 is greater than 1×20"; now Q=1, thus, letting Q add 1, M retaining unchanged, no clock pulse being output, letting N add 1;

10) P10: N=9, M=2, Q=2;
judging when "whether 9×5 is greater than 1×20" entering the pipeline, the judged result of "whether 7×5 is greater than 1×20" entering the pipeline at time P8 to be judged is obtained, the judged result is "7×5 is greater than 1×20"; Q=2, thus, letting Q return to 0, M retaining unchanged, no clock pulse being output, letting N add 1;

11) P11: N=10, M=2, Q=0;
judging when "whether 10×5 is greater than 2×20" entering the pipeline, the judged result of "whether 8×5 is greater than 2×20" entering the pipeline at time P9 to be judged is obtained, the judged result is "8×5 is not greater than 2×20", letting N add 1;

12) P12: N=11, M=2, Q=0;
judging when "whether 11×5 is greater than 2×20" entering the pipeline, the judged result of "whether 9×5 is greater than 2×20" entering the pipeline at time P10 to be judged is obtained, the judged result is "9×5 is greater than 2×20"; now Q=0, thus, letting both M and Q add 1, and outputting a clock pulse, letting N add 1;

. . .

16) P16: N=15, M=3, Q=0;
judging when "whether 15×5 is greater than 3×20" entering the pipeline, the judged result of "whether 13×5 is greater than 3×20" entering the pipeline at time P14 to be judged is obtained, the judged result is "13×5 is greater than 3×20"; now Q=0, thus, letting both M and Q add 1, and outputting a clock pulse, letting N add 1;

. . .

19) P19: N=18, M=4, Q=0;
judging when "whether 18×5 is greater than 4×20" entering the pipeline, the judged result of "whether 16×5 is greater than 4×20" entering the pipeline at time P17 to be judged is obtained, the judged result is "16×5 is not greater than 4×20", letting N add 1;

20) P20: N=19, M=4, Q=0;
judging when "whether 19×5 is greater than 4×20" entering the pipeline, the judged result of "whether 17×5 is greater than 4×20" entering the pipeline at time P18 to be judged is obtained, the judged result is "17×5 is greater than 4×20"; now Q=0, thus, letting both M and Q add 1, and outputting a clock pulse; besides, due to N=19=fs−1, thus, letting N return to 0;

21) P21: N=0, M=5, Q=1;
judging when "whether 0×5 is greater than 5×20" entering the pipeline, the judged result of "whether 18×5 is greater than 4×20" entering the pipeline at time P19 to be judged is obtained, the judged result is "18×5 is greater than 4×20"; Q=1, thus, letting Q add 1, M retaining unchanged, no clock pulse being output, letting N add 1;

22) P22: N=1, M=5, Q=2;
judging when "whether 1×5 is greater than 5×20" entering the pipeline, the judged result of "whether 19×5 is greater than 4×20" entering the pipeline at time P20 to be judged is obtained, the judged result is "19×5 is greater than 4×20"; Q=2, thus, letting Q return to 0, M retaining unchanged, no clock pulse being output, letting N add 1;

23) P23: N=2, M=5, Q=0;
judging when "whether 2×5 is greater than 5×20" entering the pipeline, the judged result of "whether 0×5 is greater than 5×20" entering the pipeline at time P21 to be judged is obtained, the judged result is "0×5 is not greater than 5×20", letting N add 1;

24) P24: N=3, M=5, Q=0;

judging when "whether 3×5 is greater than 5×20" entering the pipeline, the judged result of "whether 1×5 is greater than 5×20" entering the pipeline at time P22 to be judged is obtained, the judged result is "1×5 is greater than 5×20"; now N=3, thus, letting M return to 1, and outputting a clock pulse, letting N add 1;

25) P25: N=4, M=1, Q=0;

judging when "whether 4×5 is greater than 1×20" entering the pipeline, the judged result of "whether 2×5 is greater than 5×20" entering the pipeline at time P23 to be judged is obtained, the judged result is "2×5 is not greater than 5×20", letting N add 1;

. . .

40) P40: N=19, M=4, Q=0;

judging when "whether 19×5 is greater than 4×20" entering the pipeline, the judged result of "whether 17×5 is greater than 4×20" entering the pipeline at time P38 to be judged is obtained, the judged result is "17×5 is greater than 4×20"; now Q=0, thus, letting both M and Q add 1, and outputting a clock pulse; besides, due to N=19=fs−1, thus, letting N return to 0;

. . .

It can be seen from this that, P21~P40 form a cycle, the cycle formed by P41~P60, P61~P80, and the following are all repeated over and over according to the process of P21~P40.

For the situation of that fs is not an integral multiple of f, the implement process is similar with above embodiment, and we will not give a specific example here. It should be pointed out that, the series number of the added pipeline must be ensure that the delay period caused thereby is not longer than the time for generating an output pulse, or else an overflow can be generated. In the above embodiment, due to every four clock rising edges generate an output pulse, thus, the longest delay period can not be longer than four input clock period, or else an overflow can be generated and an error occurred, therefore, in the above embodiment, the series number of the pipeline can only be set to 2 series or 3 series.

Figure 4:
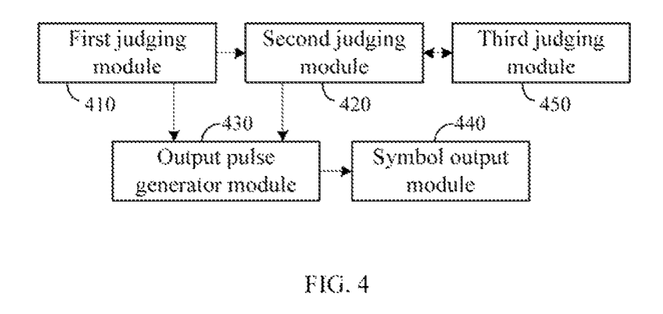
FIG. 4 shows a schematic diagram of the composition of an apparatus for implementing variable symbol rate in accordance with a preferred embodiment of the present invention.

Based on the above-mentioned method, an apparatus for implementing variable symbol rate is also provided in another embodiment of the present invention. As shown in FIG. 4, the apparatus includes counter M, N, the original values of the counters are preset to be M=1, N=0, f is a preset output symbol rate, fs is a frequency of input clock, the apparatus further comprises a first judging module 410, a second judging module 420, an output pulse generator module 430 and a symbol output module 440.

The first judging module 410 is used for judging whether N×f is greater than M×fs at the rising edge of input clock, if it is, letting the counter M add 1 and noticing the output pulse generator module 430, else noticing the second judging module 420.

The second judging module 420 is used for receiving the notice of the first judging module 410, and further judging whether the counter N is equal to fs−1; when N=fs−1, letting the counter N return to 0; when N≠fs−1, letting the counter N add 1.

The output pulse generator module 430 is used for generating an output pulse according to the notice of the first judging module 410 and transmitting the generated output pulse to the symbol output module 440.

The symbol output module 440 is used for receiving the output pulse of the output pulse generator module 430, letting the output clock pulse be the system clock, controlling the data to be output to set the symbol rate output.

It should be understood from above description about the method, before N reaches fs−1, it can be implemented that one output pulse can be output at intervals of certain input clock rising edges, in order to avoid the overflow after N=fs−1, the second judging module 420 is further used for judging N=fs−1, letting the counter N return to 0, and then letting the counter M return to 1.

Perhaps, in order to make the output pulse uniform and output continuously, and make the following cycles be transited precisely with the first cycle, it is similar with the principles of forcibly adding an output pulse in above steps 205~206, the apparatus further can comprises a third judging module 450.

Now, the second judging module 420 is used for noticing the third judging module 450 and receiving a judged result returned from the third judging module 450, if the returned judged result is N=1, letting the counter M return to 1, noticing the output pulse generator module 430, and letting the counter N add 1; if the returned judged result is N≠1, directly letting the counter N add 1.

The output pulse generator module 430 is used for generating an output pulse according to the notice of the second judging module 420 and transmitting the generated output pulse to the symbol output module 440.

The third judging module 450 is used for judging whether the value of the counter N is equal to 1 according to the notice of the second judging module 320, and returning the judged result to the second judging module 420.

Figure 5:
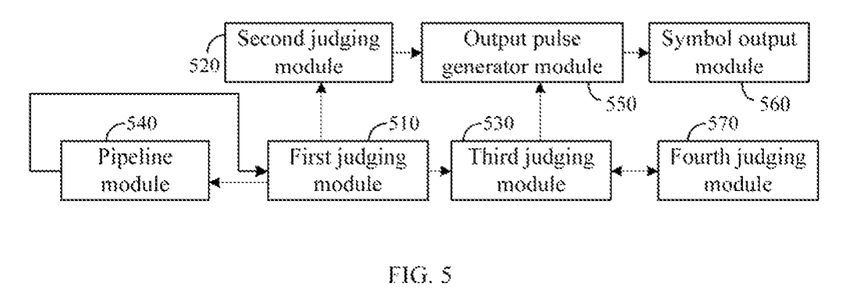
FIG. 5 shows a schematic flow diagram of the composition of an apparatus for implementing variable symbol rate with a pipeline delay in accordance with a preferred embodiment of the present invention.

It should be understood that, the apparatus shown in FIG. 4 is implemented without consideration of the delay caused by pipeline, however, in actual operation, the delay caused by the pipeline must be considered. Correspondingly, another apparatus for implementing variable symbol rate is provided in the present invention. The composition of the apparatus is shown in FIG. 5, the apparatus includes counters M, N and Q, the original values of the counters M, N and Q are preset to be M=1, N=0, Q=0, f is a preset output symbol rate, fs is a frequency of input clock, p is a pipeline series number, the apparatus further comprises a first judging module 510, a second judging module 520, a third judging module 530, a pipeline module 540, an output pulse generator module 550 and a symbol output module 560.

The first judging module 510 used for used for judging whether Ni×f is greater than Mi× fs in the input end of the pipeline module 540 at a No. i rising edge of the input clock, and receiving a judged result of whether Ni−p×f is greater than Mi−p×fs from an output end of the pipeline module 540, wherein the judged result is a No. i−p rising edge of the input clock entering the input end of the pipeline module 540, and i is a natural number; if the judged result is that Ni−p×f is greater than Mi−p×fs, noticing a second judging module 520, if the judged result is that Ni−p×f is not greater than Mi−p×fs, noticing a third judging module 530.

The second judging module 520 is used for receiving the notice of the first judging module 510, and further judging whether Q is equal to 0 or p, if Q=0, letting the counters M, Q add 1 and noticing the output pulse generator module 550; if Q=p, letting the counter Q return to 0; if Q≠0 and Q≠p, letting the counter Q add 1.

The third judging module 530 is used for further judging whether the value of the counter N is equal to fs−1; when N=fs−1, letting the counter N return to 0; when N≠fs−1, letting the counter N add 1.

The pipeline module 540 is used for receiving whether Ni×f is greater than Mi×fs from the first judging module 510 and beginning to judge at the No. i rising edge of the input clock, and returning the judged result to the first judging module 510 after delaying a number of p rising edges of the input clock.

The output pulse generator module 550 is used for generating an output pulse according to the notice of the second judging module 520 and transmitting the generated output pulse to a symbol output module 560.

The symbol output module 560 is used for receiving the output pulse of the output pulse generator module 550, letting the output clock pulse be the system clock, controlling the data to be output to set the symbol rate output.

Before N reaches fs−1, it can be implemented that one output pulse can be output at intervals of certain input clock rising edges, in order to avoid the overflow appeared after N=fs−1, the third judging module 530 is further used for judging N=fs−1, letting the counter N return to 0, and then letting the counter M return to 1.

Perhaps, in order to make the output pulse uniform and output continuously, and make the following cycles be transited precisely with the first cycle, it is similar with the principles of forcibly adding an output pulse in above steps 205~206, the apparatus further can comprises a fourth judging module 570.

The third judging module 530 is further used for noticing the fourth judging module 570 when judging N≠fs−1, and receiving a judged result returned from the fourth judging module 570, if the returned judged result is N=1, letting the counter M return to 1, noticing the output pulse generator module 550, and letting the counter N add 1; if the returned judged result is N≠1, directly letting the counter N add 1.

The output pulse generator module 550 is further used for generating an output pulse according to the notice of the third judging module 530 and transmitting the generated output pulse to the symbol output module 560.

The fourth judging module 570 is used for judging whether the value of the counter N is equal to 1 according to the notice of the third judging module 530, and returning the judged result to the third judging module 530.

As stated above, in the embodiment of the present invention of the method and apparatus for implementing variable symbol rate, it uses FPGA hardware programming to implement periodically outputting a fixed number of output pulses in a fixed period, and lets the fixed number of output pulses be the system clock of the symbol output system to implement the symbol output of set symbol rate, further implements variable symbol rate output through modifying the set parameter of the FPGA. Due to the present invention implements variable symbol rate output through a system clock in a fixed frequency, thus, the impact of the stray wave and the harmonic wave caused by variable system clock can be avoided, and the performance is stable. Besides, due to the cost of FPGA is low, thus, compared with the variable clock chip in conventional technology, the cost of the present invention is much lower.

It is to be understood, the above disclosure is only considered to be preferred embodiment of the present invention, and the spirit and scope of the invention needs not be limited to the disclosed embodiment. Any equable modification and replacement made by those ordinarily skilled in the art should be encompassed in the scope of the present invention.

What is claimed is:

1. A method for implementing variable symbol rate, presetting counters M and N, and M=1, N=0, f being a preset output symbol rate, fs being a frequency of input clock, the method comprising:

triggering to judge whether N×f is greater than M×fs at the rising edge of the input clock, if it is, letting the counter M add 1 and outputting a clock pulse; else further judging whether the value of the counter N is equal to fs−1;

when N=fs−1, letting the counter N return to 0, and waiting for the next rising edge of the input clock; when N≠fs−1, waiting for the next rising edge of the input clock after letting the counter N add 1; and letting the output clock pulse be the system clock, controlling the data to be output to set the symbol rate output.

2. The method as claimed in claim 1, further comprising: letting the counter M return to 1 after letting the counter N return to 0 and before waiting for the next rising edge of the input clock.

3. The method as claimed in claim 1, when the judged result is N≠fs−1 and before letting the counter N add 1, the method further comprising:

judging whether N is equal to 1, if it is, letting the counter M return to 1, outputting a clock pulse and executing step of letting the counter N add 1; else directly executing step of letting the counter N add 1.

4. A method for implementing variable symbol rate, presetting counters M, N and Q, and M=1, N=0, Q=0, f being a preset output symbol rate, fs being a frequency of input clock, p being a pipeline series number, the method comprising:

judging if N×f is greater than M×fs in the pipeline at a No. i rising edge of the input clock, i is a natural number, and obtaining a judged result of whether Ni−p×f is larger than Mi−p×fs when the No. i−p rising edge of the input clock entering the pipeline;

if the judged result is that Ni−p×f is larger than Mi−p×fs, when Q=0, letting the counter M, Q add 1 and outputting a clock pulse; when Q=p, letting the counter Q return to 0; when Q≠0 and Q≠p, letting the counter Q add 1;

if the judged result is that Ni−p×f is not larger than Mi−p×fs, further judging whether the value of the counter N is equal to fs−1; when N=fs−1, letting the counter N return to 0 and waiting for the next rising edge of the input clock; when N≠fs−1, letting the counter N add 1 and waiting for the next rising edge of the input clock; and letting the output clock pulse be the system clock, controlling the data to be output to set the symbol rate output.

5. The method as claimed in claim 4, further comprising: letting the counter M return to 1 after letting the counter N return to 0 and before waiting for the next rising edge of the input clock.

6. The method as claimed in claim 4, when the judged result is N≠fs−1 and before letting the counter N add 1, the method further comprising:

judging whether N is equal to 1+p, if it is, letting the counter M return to 1, outputting a clock pulse and executing step of letting the counter N add 1; else directly executing step of letting the counter N add 1.

* * * * *